July 23, 1940.   S. A. SNELL   2,209,176
JUVENILE VEHICLE STRUCTURE
Filed Jan. 9, 1939
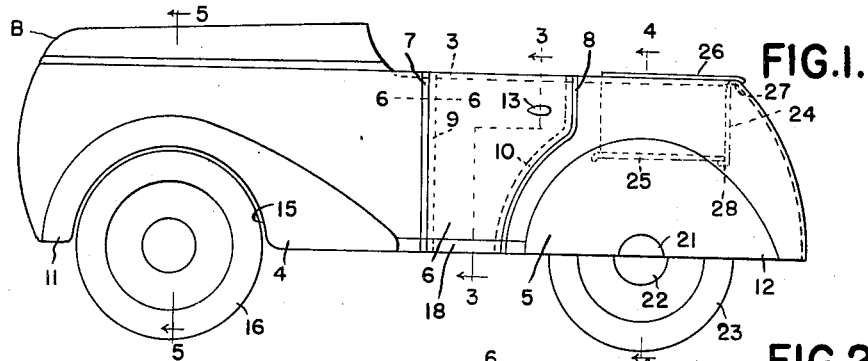
FIG.1.
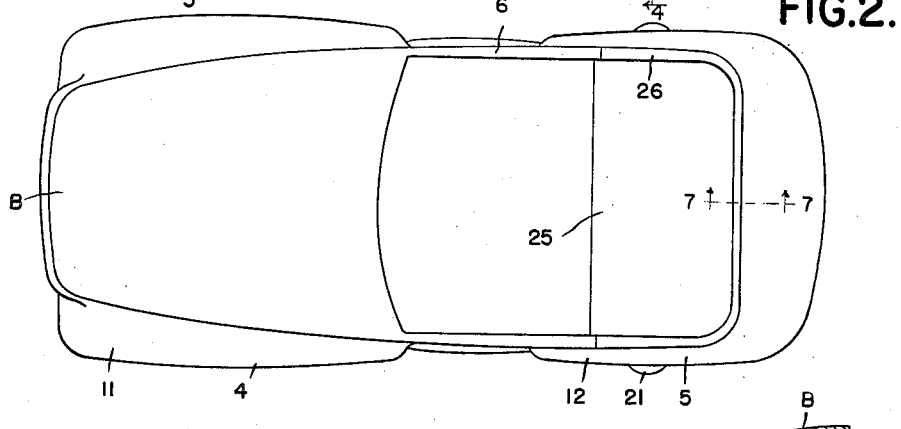
FIG.2.
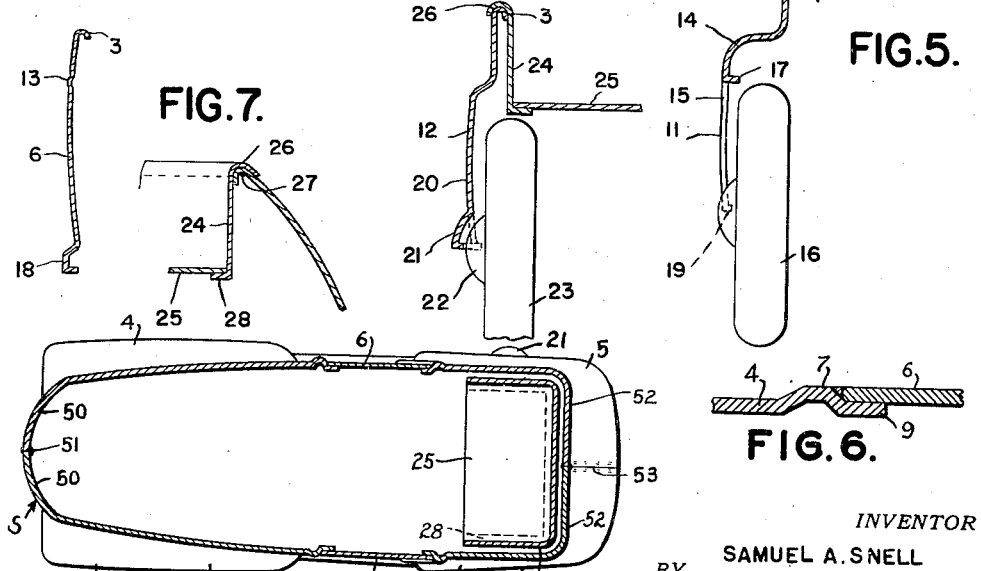
FIG.3.   FIG.4.   FIG.5.
FIG.7.
FIG.6.
FIG.8.
INVENTOR
SAMUEL A. SNELL
BY
Whittemore, Hulbert & Belknap
ATTORNEYS Patented July 23, 1940

2,209,176

UNITED STATES PATENT OFFICE 2,209,176

JUVENILE VEHICLE STRUCTURE

Samuel A. Snell, Toledo, Ohio, assignor to The American-National Company, Toledo, Ohio, a corporation of Ohio Application January 9, 1939, Serial No. 250,022

7 Claims. (Cl. 280—87.01)

This invention relates generally to juvenile vehicle bodies and constitutes a continuation in part of my application filed July 31, 1937, bearing Serial Number 156,789, which is a division of my application filed March 15, 1937, bearing Serial No. 131,101.

One of the essential objects of the present invention is to provide a body that can be manufactured entirely from sheet metal stampings and that will effectively withstand the stresses and strains to which it is subjected while in use.

Another object is to provide a body of the type mentioned that is comparatively light in weight and is attractive and pleasing in appearance.

Another object is to provide a body that can be manufactured in relatively large quantities at a comparatively low cost.

Other objects, advantages and novel details of construction of this invention will be made more apparent as this description proceeds, especially when considered in connection with the accompanying drawing, wherein:

Figure 1 is a side elevation of a juvenile vehicle body embodying my invention;

Figure 2 is a top plan view of the body illustrated in Figure 1;

Figure 3 is a sectional view taken substantially on the line 3—3 of Figure 1;

Figure 4 is a sectional view taken substantially on the line 4—4 of Figure 1;

Figure 5 is a sectional view taken substantially on the line 5—5 of Figure 1;

Figure 6 is a sectional view taken substantially on the line 6—6 of Figure 1;

Figure 7 is a sectional view taken substantially on the line 7—7 of Figure 2.

Figure 8 is a longitudinal horizontal sectional view through the juvenile vehicle body illustrated in Figure 1.

Referring now to the drawing, B is the hood, and S is the elongated load carrying shell of a juvenile automobile body made in accordance with my invention. As shown, the elements mentioned are formed from sheet metal and are permanently and rigidly united together, for example, by welding operations. Preferably, the shell S is provided at its upper edges beneath the hood B with inturned substantially flat flanges 1 to which similarly inturned substantially flat flanges 2 of the hood B are secured and is provided at its upper edges in rear of said hood with inwardly projecting flanges 3 of inverted U-cross section. In the present instance, the shell S has two forward sections 4, two rear sections 5, and two intermediate sections 6 rigidly secured together. As shown, the front and rear sections 4 and 5 are each substantially L-shape in plan and cooperate with the intermediate substantially flat sections 6 to form a rigid elongated hollow load carrying shell S having upright front and rear end walls and substantially parallel side walls. Thus, the two forward sections 4 cooperate with each other to form the forward end and adjacent portions of the side walls of the shell, while the two rear sections 5 cooperate with each other to form the rear end and adjacent portions of the side walls of the shell. Preferably the front and rear sections 4 and 5 are provided at their adjacent edges with outwardly embossed strip-like portions 7 and 8, respectively, that form frame-like abutments for the upright edges of the intermediate section 6. Portions 9 and 10 of the front and rear sections 4 and 5 between these border portions 7 and 8 constitute attaching flanges for the intermediate section 6. As illustrated in Figure 8, the inturned portions or bases 50 of the forward sections 4—4 of the shell abut and are joined together at 51 preferably by a welding operation, approximately at the longitudinal median line of the juvenile vehicle body, while the inturned portions or bases 52 of the rear sections 5—5 of the shell abut and are joined together at 53 preferably by a welding operation, approximately at the longitudinal median line of the juvenile vehicle body. As shown, the forward and rear vehicle sections 4 and 5 have outwardly embossed portions 11 and 12 of inverted L-cross section forming front and rear fenders, while the intermediate sections 6 simulate doors and have elongated embossed portions 13 simulating door latch handles. Preferably the vertical portions 14 of the front fenders are provided with openings 15 to permit the front wheels 16 of the automobile to turn, and the metal at the edges of said openings is bent inwardly to provide substantially flat stiffening flanges 17. To further stiffen and reinforce the structure, the metal of the shell S between the front and rear fenders 11 and 12 is bent outwardly, downwardly and thence inwardly to provide inwardly opening channels 18, and the metal of said shell in front and in rear of said channels 18 is bent inwardly at the lower edges of said shell to provide inwardly projecting substantially flat flanges 19. Inasmuch as the vertical portions 20 of the rear fenders are devoid of openings such as 15, such vertical portions are preferably embossed outwardly as at 21 to afford proper clearance for the hub caps 22 of the rear wheels 23 of the automobile. If desired, upright stampings 24 and a horizontal stamping 25 may be provided at the rear end of the body to constitute a seat for a child or rider of the automobile. As shown, these upright stampings 24 are provided at their upper ends with outturned flanges 26 of inverted U-configuration that overlap and are secured to the inturned flanges 3 and 27, respectively, of the shell, and are provided at their lower ends with substantially flat inturned flanges 28 that form supports for the horizontal stamping 25.

In the process of construction, the hood B is formed separately from the shell S. Likewise, the intermediate door sections 6 are formed separately from the front and rear sections 4 and 5 of said shell.

In the present instance the size of the sections 6 determines the length of the juvenile body when completed. Consequently, as inserts 6 of various sizes may be used, it is possible by their use to provide juvenile automobile bodies of different length.

What I claim as my invention is:

1. In a juvenile vehicle body of the type in which a child rides, a rigid load-carrying upright side structure having longitudinally spaced front and rear panel sections, and an intermediate panel section permanently secured to said spaced panel sections, the spaced front and rear panel sections having outwardly bulging portions forming wheel fenders, the spaced front and rear panel sections being provided between said wheel fenders with aligned, inwardly opening, longitudinally extending, reinforcing channels, the intermediate section having an inwardly opening, longitudinally extending, reinforcing channel overlapping and permanently secured to the adjacent end portions of the aligned channels aforesaid.

2. In a juvenile vehicle body of the type in which a child rides, a rigid load-carrying upright side structure having longitudinally spaced pressed metal panel sections and an intermediate panel section simulating a door, said spaced panel sections being provided at their adjacent edges with strip-like embossed portions forming frame-like abutments for the adjacent edges of the intermediate section, adjacent portions of the lower longitudinally extending edge portions of said spaced panel sections being channel-shaped, and the lower longitudinally extending edge portion of said intermediate panel section being channel-shaped and overlapping and being permanently secured to the adjacent channel-shaped portions of said spaced panel sections.

3. A juvenile vehicle body having a rigid elongated hollow load carrying shell provided with upright front and rear end walls and substantially parallel upright side walls, comprising six stampings, four of said stampings being substantially L-shape in plan and the other two of said stampings being substantially flat side panel sections, two of said four L-shaped stampings cooperating to form the forward end and adjacent portions of the side walls of the shell, the other two of said four L-shaped stampings cooperating to form the rear end and adjacent portions of the side walls of the shell, the bases of the first mentioned pair of L-shaped stampings being rigidly secured together, the bases of the second mentioned pair of L-shaped stampings being rigidly secured together, the two pairs of L-shaped stampings being spaced apart with the side wall portions of the L-shaped stampings of one pair substantially in alignment with the side wall portions of the L-shaped stampings of the second pair, and said side panel sections being intermediate and rigidly secured to adjacent edges of the side wall portions of said L-shaped stampings whereby said side panel sections cooperate with the side wall portions of said L-shaped stampings to form elongated trusses.

4. A juvenile vehicle body having a rigid elongated hollow load carrying shell, and a hood, the shell comprising six stampings, four of said stampings being substantially L-shape in plan and the other two of said stampings being substantially flat side panel sections, two of said four L-shape stampings cooperating to form the forward end and adjacent portions of the side walls of the shell, the other two of said four L-shape stampings cooperating to form the rear end and adjacent portions of the side walls of the shell, the bases of the first mentioned pair of L-shape stampings being rigidly secured together, the bases of the second mentioned pair of L-shape stampings being rigidly secured together, the two pairs of L-shape stampings being spaced apart with the side wall portions of the L-shape stampings of one pair substantially in alignment with the side wall portions of the L-shape stampings of the second pair, and said side panel sections being intermediate and rigidly secured to adjacent edges of the side wall portions of said L-shape stampings, the hood being a separate inverted substantially trough-shape stamping and being mounted upon and rigidly secured to the two L-shape stampings aforesaid forming the forward end and adjacent side portions of the shell.

5. A juvenile vehicle body having a rigid elongated hollow load carrying shell provided with upright front and rear end walls and substantially parallel upright side walls, comprising six stampings, four of said stampings being substantially L-shape in plan and the other two of said stampings being substantially flat side panel sections, the bases of two of said four L-shape stampings being secured together and forming the forward end wall of the shell, the side portions of the two L-shape stampings just mentioned being spaced apart in substantially parallel relation to each other and forming the forward side walls of the shell, the bases of the other two L-shape stampings being secured together and forming the rear end wall of the shell, the side portions of the last mentioned L-shape stampings being spaced apart in substantially parallel relation to each other and forming the rearward side walls of the shell, the side wall portions of the L-shape stampings of both pairs having outwardly embossed parts of substantially L-cross section forming respectively front and rear fenders, the two pairs of L-shape stampings being spaced apart with the side wall portions of the L-shape stampings of one pair substantially in alignment with the side wall portions of the L-shape stampings of the second pair, and said side panel sections being intermediate and rigidly secured to adjacent edges of the side wall portions of said L-shaped stampings.

6. In a juvenile vehicle body having a rigid elongated hollow load carrying shell provided with upright front and rear end walls and substantially parallel upright side walls, an upright load carrying wall structure comprising three stampings, two of said stampings being substantially L-shape in plan, and the third stamping being a substantially flat side panel section, the base of one of said L-shape stampings forming approximately one-half the front end wall of the shell, the base of the other L-shape stamping forming approximately one-half of the rear end wall of the shell, the side portions of the L-shape stampings forming side wall portions of the shell, said L-shape stampings being spaced apart with the side wall portions thereof substantially in alignment, and said side panel section being intermediate and rigidly secured to adjacent edges of the aligned spaced side wall portions of said L-shape stampings.

7. In a juvenile vehicle body of the type in which a child rides, a rigid elongated hollow load carrying shell having two rigid load carrying upright side wall structures, each of said side wall structures consisting of longitudinally spaced front and rear upright side panels, and an intermediate upright side panel section, the front panels of said side structures having inturned portions at their forward ends secured rigidly together and forming the front end wall of the shell, the rear panels of said side structures having inturned portions at their rear ends secured rigidly together and forming the rear end wall of the shell, and the intermediate panel section of each side structure being permanently secured to the adjacent edge portions of the front and rear panel sections of the respective side structures.

SAMUEL A. SNELL.